United States Patent
Seyedi (10) Patent No.: US 12,334,975 B2
(45) Date of Patent: Jun. 17, 2025

(54) SYSTEM FOR IN-BAND SPECTRAL CROSS-TALK MONITORING

(71) Applicant: Mellanox Technologies, Ltd., Yokneam (IL)

(72) Inventor: Mir Ashkan Seyedi, Atlanta, GA (US)

(73) Assignee: Mellanox Technologies, Ltd., Yokneam (IL)

( * ) Notice: Subject to any disclaimer, the term of this patent is extended or adjusted under 35 U.S.C. 154(b) by 159 days.

(21) Appl. No.: 18/110,206

(22) Filed: Feb. 15, 2023

(65) Prior Publication Data
US 2024/0275480 A1 Aug. 15, 2024

(51) Int. Cl.
H04B 10/073 (2013.01)
H04B 10/80 (2013.01)

(52) U.S. Cl.
CPC ....... *H04B 10/0731* (2013.01); *H04B 10/801* (2013.01)

(58) Field of Classification Search
CPC .......................... H04B 10/0731; H04B 10/801
USPC ........................................................ 356/73.1
See application file for complete search history.

(56) References Cited

U.S. PATENT DOCUMENTS

| | | |
|---|---|---|
| 6,345,131 B1 | 2/2002 | Jang |
| 7,409,123 B1 | 8/2008 | Feng |
| 7,542,641 B1 | 6/2009 | Asghari |
| 7,658,552 B2 | 2/2010 | Asghari |
| 7,917,035 B2 | 3/2011 | Asghari |
| 8,090,231 B1 | 1/2012 | Asghari |
| 8,160,404 B2 | 4/2012 | Pan |
| 8,242,432 B2 | 8/2012 | Feng |
| 8,346,028 B2 | 1/2013 | Feng |
| 8,411,260 B1 | 4/2013 | Feng |
| 8,463,088 B1 | 6/2013 | Asghari |

(Continued)

FOREIGN PATENT DOCUMENTS

WO 2022200292 A1 9/2022

OTHER PUBLICATIONS

Ackermann, M. et al., "Sub-wavelength tunneling barrier in rib waveguide microring modulators with vanishing pending losses," Opt. Lett. 47, 2626-2629 (2022).

(Continued)

*Primary Examiner* — Md M Rahman
(74) *Attorney, Agent, or Firm* — Anup Lyer; Moore & Van Allen PLLC (57) ABSTRACT

Systems and methods are described for in-band spectral cross-talk monitoring. An example system includes a built-in self-test (BIST) and logic circuitry and a processor. The processor is operatively coupled to the BIST and logic circuitry, a first micro ring modulator (MRM) associated with a first data packet (FD), and a second MRM associated with a second data packet (SD). The processor is configured to: receive, from the first MRM, a complement of the first data packet ($\overline{FD}$) that comprises second MRM spectral cross-talk data; receive, from a second MRM, a complement of the second data packet ($\overline{SD}$); and determine, using the BIST and logic circuitry, a spectral ordering of the FD and the SD based on at least the second MRM spectral cross-talk data and the $\overline{SD}$ to address shifting in the initial mapping of the positional order of the MRMs and the spectral order of the data packets.

20 Claims, 5 Drawing Sheets

(56) References Cited

U.S. PATENT DOCUMENTS

| | | |
|---|---|---|
| 8,476,576 B2 | 7/2013 | Dong |
| 8,526,769 B1 | 9/2013 | Feng |
| 8,638,485 B2 | 1/2014 | Feng |
| 8,724,100 B1 | 5/2014 | Asghari |
| 8,728,837 B2 | 5/2014 | Fong |
| 8,737,772 B2 | 5/2014 | Dong |
| 8,817,354 B2 | 8/2014 | Feng |
| 8,897,606 B2 | 11/2014 | Asghari |
| 8,965,208 B2 | 2/2015 | Asghari |
| 8,989,522 B2 | 3/2015 | Qian |
| 9,025,241 B2 | 5/2015 | Asghari |
| 9,142,698 B1 | 9/2015 | Cunningham |
| 9,217,831 B1 | 12/2015 | Asghari |
| 9,217,836 B2 | 12/2015 | Asghari |
| 9,244,327 B2 | 1/2016 | Prosyk |
| 9,274,353 B1 | 3/2016 | Dong |
| 9,279,936 B2 | 3/2016 | Qian |
| 9,312,960 B1 | 4/2016 | Feng |
| 9,379,515 B1 | 6/2016 | Asghari |
| 9,588,294 B2 | 3/2017 | Fong |
| 9,702,278 B2 | 7/2017 | Gruener |
| 9,798,166 B1 | 10/2017 | Sharma |
| 9,966,733 B2 | 5/2018 | Feng |
| 9,991,965 B2 | 6/2018 | Christensen |
| 10,031,355 B2 | 7/2018 | Feng |
| 10,078,232 B1 | 9/2018 | Vermeulen |
| 10,288,805 B2 | 5/2019 | Luff |
| 10,330,864 B2 | 6/2019 | Asghari |
| 10,394,060 B2 | 8/2019 | Mentovich |
| 10,649,244 B1 | 5/2020 | Mentovich |
| 10,895,797 B2 | 1/2021 | Cavaliere |
| 11,397,363 B2 | 7/2022 | Kawakami |
| 2008/0008471 A1* | 1/2008 | Dress ............ G06E 3/006 398/118 |
| 2010/0330727 A1 | 12/2010 | Hill |
| 2012/0251029 A1 | 10/2012 | Kobrinsky |
| 2013/0182305 A1 | 7/2013 | Feng |
| 2015/0010263 A1 | 1/2015 | Fong |
| 2015/0055911 A1 | 2/2015 | Bowers |
| 2017/0269391 A1 | 9/2017 | Feng |
| 2017/0351124 A1 | 12/2017 | Roth |
| 2018/0314128 A1 | 11/2018 | Sun |
| 2019/0179177 A1 | 6/2019 | Rickman |
| 2019/0293971 A1 | 9/2019 | Yu |
| 2020/0012043 A1 | 1/2020 | Abediasl |
| 2020/0124878 A1 | 4/2020 | Yu |
| 2021/0191164 A1 | 6/2021 | Mentovich |
| 2021/0336418 A1 | 10/2021 | Iakovlev |
| 2022/0236619 A1 | 7/2022 | Hoessbacher |
| 2022/0337321 A1 | 10/2022 | Argyris |
| 2023/0018578 A1 | 1/2023 | Bakopoulos |

OTHER PUBLICATIONS

Akiyama, S. et al. "Cascaded-ring-resonator-loaded Mach-Zehnder modulator for enhanced modulation efficiency in wide optical bandwith," Opt. Expr. 20, 16321-16338 (2012).

Akiyama, Suguru et al. "InP-Based Mach-Zehnder Modulator With Capacitively Loaded Travelling-Wave Electrodes," Journal of Lightwave Technology, vol. 26, No. 5, Mar. 1, 2008, pp. 608-615, DOI: 10.1109/JLT.2007.915278.

Bin Wang et al. (2022), "Principles of Selective Area Epitaxy and Applications in III-V Semiconductor Lasers Using MOCVD: A Review," Crystals 2022, 12(7), 1011.

Chacinski, Marck et al. "Monolithically Integrated 100 GHz DFB-TWEAM," Journal of Lightwave Technology, vol. 27, No. 16, Aug. 15, 2009, pp. 3410-3415, DOI: 10.1109/JLT.2009.2015773. Available online: URL: https://opg.optica.org/jlt/abstract.cfmuri=jlt-27-16-3410.

Cui, Yansong et al. "Modeling and Design of GaAs Traveling-Wave electrooptic Modulators Based on Capacitively Loaded Coplanar Strips," Journal of Lightwave Technology, vol. 24, No. 1, Jan. 2006, pp. 544-554, DOI: 10.1109/JLT.2005.859851.

D. A. B. Miller et al. (1984), "Band-Edge Electroabsorption in Quantum Well Structures: The Quantum-Confined Stark Effect," Phys. Rev. Lett. 53, 2173.

Han, C. et al., "Recent progress in silicon-based slow-light electro-optic modulators," Micromachines 13, 400 (2022).

Han, C. et al., "Ultra-compact silicon modulator with 110 GHz bandwidth," in Proc. Opt. Fib. Comm. Conf. (OFC), (Optica Publishing Group, Washington, D.C. 2022), p. Th4C.5.

Horikawa, T. et al., "A 300-nm silicon photonics platform for large-scale device integration," J. Sel. Top. Quant. Electron, 24, 8200415 (2018).

Hou et al. (2010), "Monolithic 40 GHz passively Mode-locked AlGaInAs/InP 1.55 mm MQW Laser with Surface-etched Bragg Gratings," European Conference on Integrated Optics (ECIO 10).

J. Yan, T. Yeh, Y. Chang, Y. Wu, and K. Feng, "DSP Equalization-free Data Center Communication with High Dispersion Tolerant Optical Duobinary-PAM4 Signal," in Conference on Lasers and Electro-Optics, OSA Technical Digest (online) (Optical Society of America, 2017), paper SF1L.4.

Jafari, O. et al., "Mach-Zehnder silicon photonic modulator assisted by phase-shifted bragg gratings," Photon. Technol. Lett. 32, 445-448 (2020).

K. Yonenaga and S. Kuwano, "Dispersion-Tolerant Optical Transmission System Using Duobinary Transmitter and Binary Receiver," IEEE J. Lightwave Technol., vol. 15, No. 8, pp. 1530-1537, 1997.

Klein, H.N. et al. "1.55µm Mach-Zehnder Modulators on InP for Optical 40/80 Gbit/s Transmission Networks," In 2006 International Conference on Indium Phosphide and Related Materials Conference Proceedings, May 8, 2006, pp. 171-173, IEEE.

Lange, Sophie et al. "100 GBd Intensity Modulation and Direct Detection With an InP-Based Monolithic DFB Laser Mach-Zehnder Modulator," Journal of Lightwave Technology, vol. 36, No. 1, Jan. 1, 2018, pp. 97-102.

Lange, Sophie et al. "Low Switching Voltage Mach-Zehnder Modulator Monolithically Integrated With DFB Laser for Data Transmission Up to 107.4 Gb/s," Journal of Lightwave Technology, vol. 34, No. 2, Jan. 15, 2016, pp. 401-406, DOI: 10.1109/JLT.2015.2496426.

Li, G.L. et al. "Analysis of Segmented Traveling-Wave Optical Modulators," Journal of Lightwave Technology, vol. 22, No. 7, Jul. 2004, pp. 1789-1796, DOI: 10.1109/JLT.2004.831179. Available online: URL: https://opg.optica.org/jlt/abstract.cfmuri=jlt-22-7-1789.

Li, G.L. et al. "Numerical Modeling of Segmented Traveling-Wave Electroabsorption Modulators," In 2004 IEE MTIT-S International Microwave Symposium Digest (IEEE Cat. No. 04CH37535), Jun. 6, 2004, vol. 2, pp. 773-776, IEEE.

Margalit, N. et al., "Perspectives on the future of silicon photonics and electronics," Appl. Phys. Lett. 118, 220501 (2021).

Nakai, Y. et al. (2019), "Uncooled Operation of 53-GBd PAM4 (106-Gb/s) EA/DFB Lasers With Extremely Low Drive Voltage With 0.9 Vpp," Journal of Lightwave Technology, vol. 37, Issue 7, pp. 1658-1662.

Nan Qi et al., Co-Design and Demonstration of a 25 Gbps Silicon-Photonic Mach Zehnder Modulator with a CMOS Based High Swing Driver, IEEE, Nov. 2016, pp. 1-11 (Year: 2016).

Ogiso, Yoshihiro et al. "Over 67 GHz Bandwidth and 1.5 V Vp InP-Based Optical IQ Modulator With n-i-p-n Heterostructure," Journal of Lightwave Technology, vol. 35, No. 8, Apr. 15, 2017, pp. 1450-1455, DOI: 10.1109/JLT.2016.2639542.

Qian, Guang et al. "CL-TWE Mach-Zehnder Electro-Optic Modulator Based on InP-MQW Optical Waveguides," Chinese Optics Letters, vol. 17, No. 6, Jun. 2019, pp. 061301-1-061301-5, DOI: 10.3788/COL201917.061301.

Romero-Garcia, Sebastian et al., "High-speed resonantly enhanced silicon photonics modulator with a large operating temperature range", Optic Letters, vol. 42, Issue 1, pp. 81-84 (2017). https://doi.org/10.1364/OL.42.000081.

Sharif Azadeh, S. et al., "Low Vp silicon photonics modulators with highly linear epitaxially grown phase shifters," Opt. Expr. 23, 23526-23550 (2015).

(56) References Cited

OTHER PUBLICATIONS

Stepanenko, M. et al. "Optimization of RF Electrodes for Electro-Optic Modulator Based on Quantum-Confined Stark Effect," In Journal of Physics: Conference Series 2019, vol. 1145, No. 1:012028, pp. 1-6, IOP Publishing.

Stepanenko, Mikhail et al. "Multi-Parameter Optimization of an InP Electro-Optic Modulator," Symmetry, vol. 12, Nov. 21, 2020, pp. 1-18, DOI: 10.3390/sym12111920.

Tamura, M. et al. (2003), "High-speed electroabsorption modulators using ruthenium-doped SI-InP: impact of interdiffusion-free burying technology on E/O modulation characteristics," International Conference on Indium Phosphide and Related Materials, 2003. pp. 491-494.

Terada, Y. et al., "Full C-band Si photonic crystal waveguide modulator," Opt. Lett. 42, 5110-5112 (2017).

U.S. Appl. No. 17/644,625, filed Dec. 16, 2021, entitled "High Bandwidth Optical Modulator".

U.S. Appl. No. 17/694,159, filed Mar. 14, 2022, entitled "Serial Data Conversion Redundacy Using Optical Modulators".

U.S. Appl. No. 17/810,068, filed Jun. 30, 2022, entitled "High Bandwidth Travelling Wave Electro Absorption Modulator (EAM) Chip".

U.S. Appl. No. 18/120,719, filed Mar. 13, 2023, entitled "Differential Traveling Wave Electro-Absorption Modulator for High Bandwidth Operation".

U.S. Appl. No. 18/120,802, filed Mar. 13, 2023, entitled "Low Voltage Traveling Wave Electro- Absorption Modulator for High Bandwidth Operation".

U.S. Appl. No. 63/266,527, filed Jan. 7, 2022, entitled "High Bandwidth Travelling Wave Electro Absorption Modulator (EAM) Chip".

Velthaus, K.-O. et al. "High Performance InP-Based Mach-Zehnder Modulators for 10 to 100 Gb/s Optical Fiber Transmission Systems," 23rd International Conference on Indium Phosphide and Related Materials—IPRM 2011, May 22-26, 2011, (4 pages), Berlin, Germany.

Wang, Gary et al. "Low Vp, High Bandwidth, Small Form Factor InP Modulator," in 2014 IEEE Avionics, Fiber-Optics and Photonics Technology Conference (AVFOP), Nov. 11, 2014, pp. 41-42, IEEE.

Witzens, J., "High-Speed silicon photonics modulators," Proc. IEEE 106, 2158-2182 (2017).

Yamazaki, Hiroshi et al. "IMDD Transmission at Net Data Rate of 333 Gb/s Using Over-100-GHz-Bandwidth Analog Multiplexer and Mach-Zehnder Modulator," Journal of Lightwave Technology, vol. 37, No. 8, Apr. 15, 2019, pp. 1772-1778, DOI: 10.1109/JLT.2019.2898675.

U.S. Appl. No. 17/993,296, filed Nov. 23, 2022, entitled "Traveling Wave Cascaded Micro Ring Modulators", assigned to Mellanox Technologies, Ltd., 32 pages.

* cited by examiner

SYSTEM FOR IN-BAND SPECTRAL CROSS-TALK MONITORING

TECHNOLOGICAL FIELD

Example embodiments of the present disclosure relate to optical interconnects for high performance computing (HPC), more particularly, to spectral ordering of data packets processed by the optical interconnects.

BACKGROUND

Wavelength division multiplexing (WDM) allows multiple optical carrier signals to be combined for transmission via a single optical fiber by using different wavelengths (e.g., colors) of laser light. Optical communication systems with WDM interconnects often include spectrally sensitive micro ring modulators (MRMs) to selectively encode data onto each of the different wavelengths, and subsequently extract data therefrom.

Applicant has identified a number of deficiencies and problems associated with data communication for optical interconnects. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for addressing shifts in the initial mapping of the positional order of the MRMs and the spectral order of the data packets using in-band spectral cross-talk monitoring.

In one aspect, a system for in-band spectral cross-talk monitoring is presented. The system comprising: a built-in self-test (BIST) and logic circuitry; and a processor operatively coupled to the BIST and logic circuitry, a first micro ring modulator (MRM) associated with a first data packet (FD), and a second MRM associated with a second data packet (SD), wherein the processor is configured to: receive, from the first MRM, a complement of the first data packet ($\overline{FD}$), wherein the $\overline{FD}$ comprises second MRM spectral cross-talk data; receive, from a second MRM, a complement of the second data packet ($\overline{SD}$); and determine, using the BIST and logic circuitry, a spectral ordering of the FD and the SD based on at least the second MRM spectral cross-talk data and the $\overline{SD}$.

In some embodiments, the first MRM is configured to encode the FD on a first carrier wavelength, the second MRM is configured to encode the SD on a second carrier wavelength, wherein the first carrier wavelength is shorter than the second carrier wavelength.

In some embodiments, the processor is further configured to: determine a positional order of the first MRM and the second MRM; determine a first spectral order of the FD and the SD; and determine, using the BIST and logic circuitry, whether the second MRM spectral cross-talk data matches the $\overline{SD}$; and determine that the positional order corresponds to the first spectral order in an instance in which the second MRM spectral cross-talk data matches the $\overline{SD}$.

In some embodiments, the processor is further configured to: determine that the positional order does not correspond to the first spectral order in an instance in which the second MRM spectral cross-talk data does not match the $\overline{SD}$.

In some embodiments, the processor is further configured to: determine a second spectral order of the FD and the SD such that the positional order corresponds to the second spectral order; and re-order, using the BIST and logic circuitry, the FD and the SD according to the second spectral order.

In some embodiments, the first MRM comprises a first photodetector (PD) operatively coupled to a first drop port of the first MRM and configured to generate a first photocurrent ($FI_{ph}$), and the second MRM comprises a second PD operatively coupled to a second drop port of the second MRM and configured to generate a second photocurrent ($SI_{ph}$).

In some embodiments, each of the $FI_{ph}$, and $SI_{ph}$ comprises an alternating current (AC) component and a direct current (DC) component.

In some embodiments, the AC component of $FI_{ph}$ comprises the $\overline{FD}$, and the AC component of $SI_{ph}$ comprises the $\overline{SD}$.

In some embodiments, the DC component of $FI_{ph}$ comprises a root means square (RMS) current value associated with on-resonance behavior of the first MRM, and the DC component of $SI_{ph}$ comprises an RMS current value associated with on-resonance behavior of the second MRM.

In some embodiments, the processor is further configured to: tune, using a first wavelength of resonance (WOR) control circuitry, the first MRM to a first carrier frequency based on at least the RMS current value associated with the on-resonance behavior of the first MRM; and tune, using a second WOR control circuitry, the second MRM to a second carrier frequency based on at least the RMS current value associated with the on-resonance behavior of the second MRM.

In another aspect, a method for in-band spectral cross-talk monitoring is presented. The method comprising: receiving, from a first micro ring modulator (MRM), a complement of a first data packet ($\overline{FD}$), wherein the $\overline{FD}$ comprises second MRM spectral cross-talk data; receiving, from a second MRM, a complement of a second data packet ($\overline{SD}$); and determining, using a built-in self-test (BIST) and logic circuitry, a spectral ordering of the FD and the SD based on at least the second MRM spectral cross-talk data and the $\overline{SD}$.

In yet another aspect, a computer program product for in-band spectral cross-talk monitoring is presented. The computer program product comprising a non-transitory computer-readable medium comprising code causing an apparatus to: receive, from a first micro ring modulator (MRM), a complement of a first data packet ($\overline{FD}$), wherein the $\overline{FD}$ comprises second MRM spectral cross-talk data; receive, from a second MRM, a complement of a second data packet ($\overline{SD}$); and determine, using a built-in self-test (BIST) and logic circuitry, a spectral ordering of the FD and the SD based on at least the second MRM spectral cross-talk data and the $\overline{SD}$.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany- ing drawings. The components illustrated in the figures may or may not be present in certain embodiments described herein. Some embodiments may include fewer (or more) components than those shown in the figures.

DETAILED DESCRIPTION

Overview

Wavelength division multiplexing (WDM) allows multiple optical carrier signals to be combined for transmission via a single optical fiber by using different wavelengths (e.g., colors) of laser light. Optical communication systems with WDM interconnects often include spectrally sensitive micro ring modulators (MRMs) to selectively encode data onto each of the different wavelengths, and subsequently extract data therefrom. As such, when a WDM link is transmitting data, multiple MRMs may be employed to facilitate the communication. Depending on the size of the data and the number of MRMs used, the data is divided into multiple data packets, where each data packet is processed by an MRM. For example, in a transmitter with 8 MRMs, 64 bit data may be divided into 8 data packets (one data packet for each MRM). The first MRM may encode bits 0-7, the second MRM may encode bits 8-15, etc., and the eighth MRM may encode bits 57-64. Once transmitted, a receiver may receive each data packet individually and combine them to recreate the original data. To efficiently combine the data packets, the MRMs are arranged (on-chip) in such a way that there is a one-to-one correlation between the MRMs and the data packets processed by them. In other words, positional order of the MRMs is mapped to the spectral order of the data packets (e.g., order in which the data packets are combined) so that the receiver is aware of the spectral order of the data packets it receives, allowing for efficient recreation of the data. However, local temperature variations in the transmitter may result in a shift in the initial mapping of the positional order with respect to the spectral order. In other words, the positional order of the MRMs may no longer correspond to the spectral order of the data packets. The receiver remains unaware of this shift, however, resulting in erroneous combining of the data packets based on the positional order.

Embodiments of the present invention addresses this issue by using spectral channel cross-talk to identify if there is a shift in the initial mapping of the positional order with respect to the spectral order and to compensate for the shift while the communication link between the transmitter and receiver remains fully operational. In embodiments described in greater detail herein, each MRM may include a photodetector (PD) operatively coupled to a corresponding drop port that is configured to generate a photocurrent. The photocurrent may include an alternating current (AC) component and a direct current (DC) component. The AC component of the photocurrent may include the complement of the data packet being processed by the MRM while the DC component of the photocurrent may include a root means square (RMS) current value associated with on-resonance behavior of the MRM. The RMS current value may be used to locally tune the MRM to a specific carrier wavelength. The complement of the data packet may include spectral cross-talk from an adjacent MRM (operating at a higher carrier wavelength). The spectral cross-talk may be used to identify the particular data packet being processed by the adjacent MRM. If the data packet identified in the spectral cross-talk from the adjacent MRM matches the actual data packet transmitted by the adjacent MRM, then it can be determined that the positional arrangement of the MRMs matches the spectral arrangement of the data packets. However, if the data packet identified in the spectral cross-talk from the adjacent MRM does not match the actual data packet transmitted by the adjacent MRM, then the spectral arrangement of the data packets may need to be altered. Accordingly, embodiments of the invention may determine an updated spectral order of the data packets based on the spectral cross-talk received from the MRMs and re-order the data packets. In addition to determining an updated spectral order, embodiments of the invention may transmit a notification to the receiver indicating the re-ordering so that the receiver may combine the data packets according to the updated spectral order.

Embodiments of the present invention will now be described more fully hereinafter with reference to the accompanying drawings, in which some, but not all, embodiments are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically coupled and/or are in or are capable of electrical communication with one another, or are optically coupled and/or are in or are capable of optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

It should be understood that the word "exemplary" is used herein to mean "serving as an example, instance, or illustration." Any implementation described herein as "exemplary" is not necessarily to be construed as advantageous over other implementations.

Furthermore, as would be evident to one of ordinary skill in the art in light of the present disclosure, the terms "substantially" and "approximately" indicate that the referenced element or associated description, feature, characteristic, or trait is accurate to within applicable engineering tolerances.

Example Device Ownership Transfer (DOT) Systems

Figure 1A:
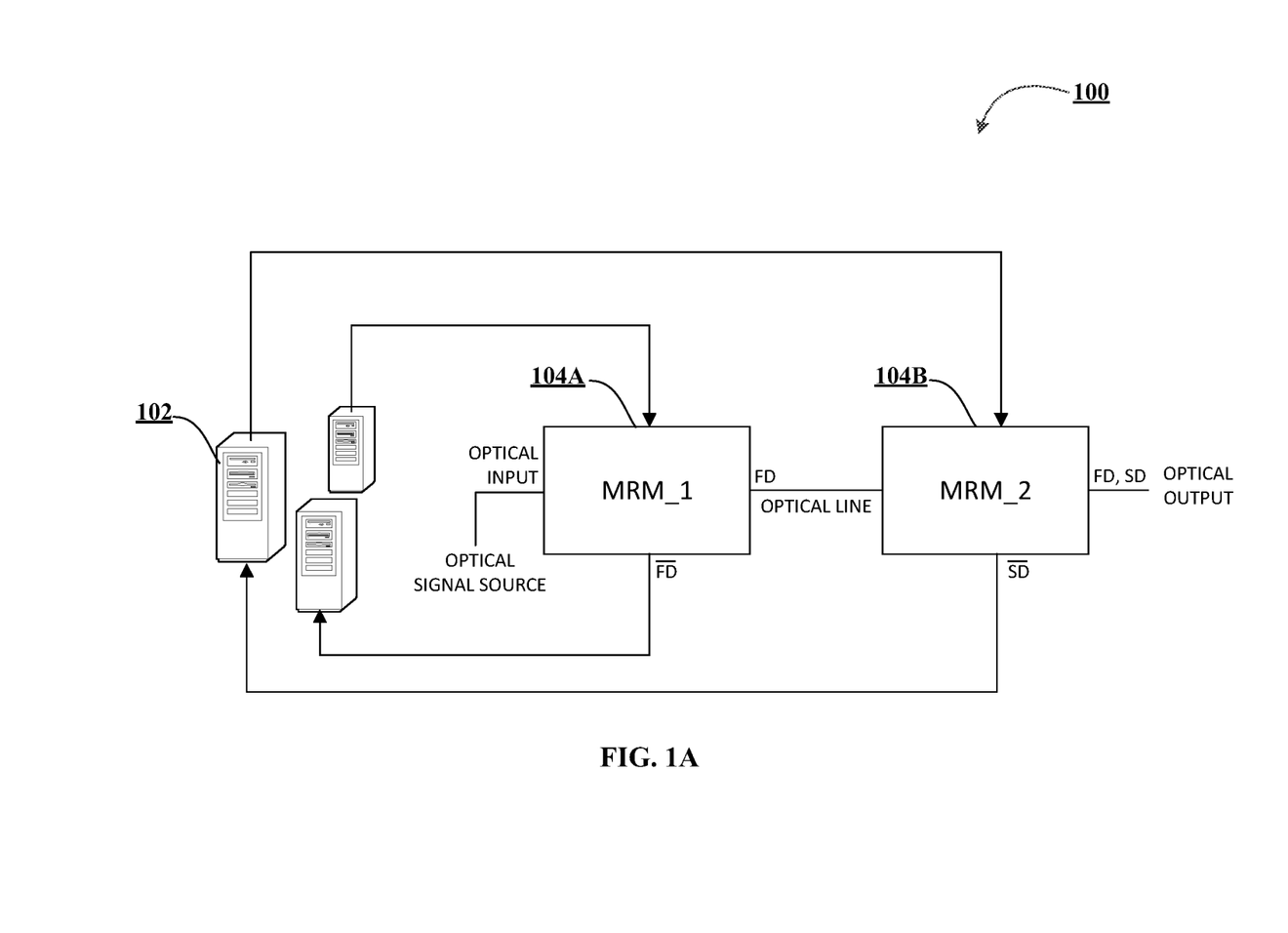
FIG. 1A illustrates technical components of a computing environment for in-band spectral cross-talk monitoring, in accordance with an embodiment of the present disclosure.

FIG. 1A illustrates technical components of an example computing environment for in-band spectral cross-talk monitoring 100, in accordance with an embodiment of the present disclosure. As shown in FIG. 1A, the computing environment 100 may include a system 102 and a plurality of micro ring modulators (MRMs), such as a first MRM (MRM_1) 104A and a second MRM (MRM_2) 104B. It is to be understood that the structure of the computing environment 100 and its components, connections and relationships, and their functions, are meant to be examples, only, and are not meant to limit implementations of the embodiments described and/or claimed in this document. In one example, the computing environment 100 may include more, fewer, or different components. In another example, some or all of the portions of the computing environment 100 may be combined into a single portion, or all of the portions of the computing environment 100 may be separated into two or more distinct portions.

The system 102 may be implemented in a number of different forms. For example, the system 102 may be implemented as a standard server, or multiple times in a group of such servers. Additionally, the system 102 may also be implemented as part of a rack server system or a personal computer such as a laptop computer. Alternatively, components from the system 102 may be combined with one or more other same or similar systems and an entire system 102 may be made up of multiple computing devices communicating with each other. The system 102 may include various forms of servers, such as web servers, database servers, file servers, or the like, various forms of digital computing devices, such as laptops, desktops, workstations, or the like, or any other auxiliary network devices, Internet-of-things devices, electronic kiosk devices, mainframes, or the like, or any combination of the aforementioned. The system 102 is described in greater detail below in connection with FIG. 1B.

With continued reference to FIG. 1A, the MRMs (e.g., MRM_1 104A, MRM_2 104B) may be spectrally sensitive electro-optical (EO) modulators that are used in wavelength division multiplexing (WDM) systems. EO modulators are optical devices in which a signal-controlled element that exhibits an electro-optic effect is used to modulate an optical signal. The MRMs may be used to control the amplitude, phase, and/or polarization state of an optical signal electrically. As such, when a WDM link is transmitting data, multiple MRMs may be employed to facilitate the communication.

Each MRM (e.g., MRM_1 104A, MRM_2 104B) may be configured to operate at a particular carrier wavelength and may be used to selectively encode data onto an optical signal at the respective wavelength. Each MRM may include a photodetector that is operatively coupled to a drop port associated therewith. In some embodiments, a drop port of an MRM may provide a low output signal that is used to attenuate the incoming optical signal before the optical signal is processed by the MRM. The photodetector may be used to optically encode a complement of the data being processed by the MRM, resulting in the generation of a photocurrent signal that has both alternating current (AC) components and direct current (DC) components, as described in further detail in FIG. 2. Each MRM may include a bias-T circuit, a three-port circuit that is used for setting a DC bias point and inserting DC power into an AC signal to separate the AC component and the DC component, as described in further detail in FIG. 2. In specific embodiments, each MRM may include a transimpedance amplifier to maintain a constant voltage bias between the photodetector and the bias-T circuit.

As shown in FIG. 1A, the MRMs may be cascaded in a series connection such that the output of the first MRM (e.g., MRM_1 104A) is connected to the input of the second MRM (e.g., MRM_2 104B). When cascaded, the MRMs may be connected via an optical line. In some embodiments, MRMs may be connected to an optical signal source, such that the MRMS can receive an optical input signal from the optical signal source and subsequently modulate a phase and/or an amplitude of the optical input signal. The modulated optical signal is then transmitted as optical output to an external circuit. The MRMs are positioned in such a way that the first MRM (e.g., MRM_1 104A) is configured to operate at a carrier wavelength that is lower than the second MRM (e.g., MRM_2 104B), and the second MRM is configured to operate at a carrier wavelength that is lower than a third MRM (not shown in the depicted example). As such, the MRMs 104A, 104B are positionally ordered according to their operating carrier wavelengths, where the MRM operating at the lowest carrier wavelength is positioned first, followed by an MRM operating at second lowest carrier wavelength, and so on.

In some embodiments, the MRMs may be substantially identical to one another. For example, the MRM_1 104A and MRM_2 104B may have identical configuration in terms of Q-factors, center wavelength of resonance, coupling coefficients, voltage bias requirements, and/or the like. In some other embodiments, the MRM_1 104A and MRM_2 104B may not be substantially identical. For example, the MRM_1 104A and MRM_2 104B may be at least partially different in terms of varying Q-factors, which may be used to shape the frequency spectrum of the modulated optical output signal, varying center wavelength of resonance to broaden the frequency response, varying coupling coefficients, varying voltage bias requirements, and/or the like.

Example System Circuitry

Figure 1B:
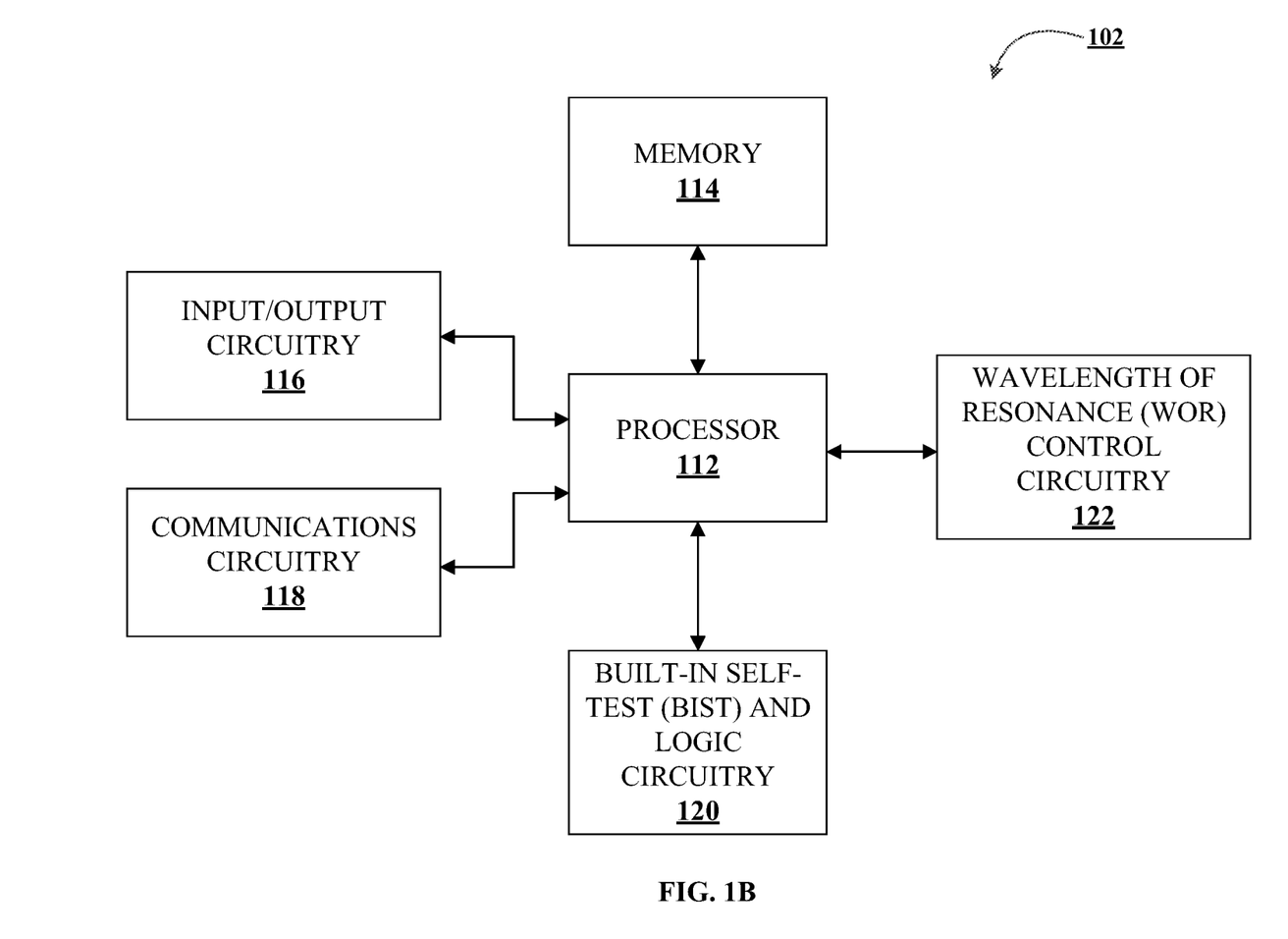
FIG. 1B illustrates an example block diagram of a system for use with various embodiments of the present disclosure.

FIG. 1B illustrates an example block diagram of a system 102 for use with various embodiments of the present disclosure. As shown in FIG. 1B, the system 102 may include a processor 112, a memory 114, input/output circuitry 116, communications circuitry 118, built-in self-test (BIST) and logic circuitry 120, and a wavelength of resonance (WOR) control circuitry 122.

Although the term "circuitry" as used herein with respect to components 112-122 is described in some cases using functional language, it should be understood that the particular implementations necessarily include the use of particular hardware configured to perform the functions associated with the respective circuitry as described herein. It should also be understood that certain of these components 112-122 may include similar or common hardware. For example, two sets of circuitries may both leverage the same processor, network interface, storage medium, or the like to perform their associated functions, such that duplicate hardware is not required for each set of circuitries.

While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the system 102 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or co-processor or any other processing circuitry assisting or otherwise associated with the processor) may be in communication with the memory 114 via a bus for passing information among components of, for example, the system 102. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., the system 102, to carry out various functions in accordance with example embodiments of the present disclosure.

Although illustrated in FIG. 1B as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the system 102 to carry out various functions in accordance with example embodiments discussed herein. For example, in at least some embodiments, the memory 114 is configured to buffer data for processing by the processor 112. Additionally, or alternatively, in at least some embodiments, the memory 114 is configured to store program instructions for execution by the processor 112. The memory 114 may store information in the form of static and/or dynamic information. This stored information may be stored and/or used by the system 102 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 1B as a single processor, in some embodiments, the processor 112 may include a plurality of processors. The plurality of processors may be embodied on a single computing device or may be distributed across a plurality of such devices collectively configured to function as the system 102. The plurality of processors may be in operative communication with each other and may be collectively configured to perform one or more functionalities of the system 102 as described herein.

In an example embodiment, the processor 112 is configured to execute instructions stored in the memory 114 or otherwise accessible to the processor 112. Alternatively or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure the processor 112 to perform one or more algorithms and/or operations described herein when the instructions are executed. For example, these instructions, when executed by the processor 112, may cause the system 102 to perform one or more of the functionalities thereof as described herein.

In some embodiments, the system 102 further includes input/output circuitry 116 that may, in turn, be in communication with the processor 112 to provide an audible, visual, mechanical, or other output and/or, in some embodiments, to receive an indication of an input from a customer or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. The input/output circuitry 116 may include a customer interface and may include a web customer interface, a mobile application, a kiosk, or the like.

The processor 112 and/or customer interface circuitry comprising the processor 112 may be configured to control one or more functions of a display or one or more customer interface elements through computer-program instructions (e.g., software and/or firmware) stored on a memory accessible to the processor 112 (e.g., the memory 114, and/or the like). In some embodiments, aspects of the input/output circuitry 116 may be reduced as compared to embodiments where the system 102 may be implemented as an end-customer machine or other type of device designed for complex customer interactions. In some embodiments (like other components discussed herein), the input/output circuitry 116 may be eliminated from the system 102. The input/output circuitry 116 may be in communication with the memory 114, communications circuitry 118, and/or any other component(s), such as via a bus. Although more than one input/output circuitry and/or other component can be included in the system 102, only one is shown in FIG. 1B to avoid overcomplicating the disclosure for ease of explanation (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with the device. In this regard, the communications circuitry 118 may include, for example, a network interface for enabling communications with a wired or wireless communication network. For example, in some embodiments, communications circuitry 118 may be configured to receive and/or transmit data that may be stored by the memory 114 using any protocol that may be used for communications between computing devices. For example, the communications circuitry 118 may include one or more network interface cards, antennae, transmitters, receivers, buses, switches, routers, modems, and supporting hardware and/or software, and/or firmware/software, or any other device suitable for enabling communications via a network. Additionally, or alternatively, in some embodiments, the communications circuitry 118 may include circuitry for interacting with antenna(e) to cause transmission of signals via the antenna(e) or to handle receipt of signals received via the antenna(e). These signals may be transmitted by the system 102 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of system 102, such as via a bus. The communication circuitry 118 of the system 102 may also be configured to receive and transmit information with the various network ports discussed herein.

The BIST and logic circuitry 120 may include hardware, software, firmware, and/or a combination of such components, to determine whether the positional order of the MRMs (e.g., MRMs 104A, 104B) corresponds to the spectral order of the data packets. As described herein, during transmission, the data is divided into multiple data packets, and each data packet is processed by a dedicated MRM. The BIST and logic circuitry 120 may receive the data encoded in each packet that is processed by an MRM in the form of a complement. The complement of the data may not only include information associated with the data encoded in the data packet processed by the MRM, but also include cross-talk data—an overlap of emission spectra—from an adjacent MRM. If the spectral cross-talk data that identifies the data encoded in a data packet being processed by an adjacent, second MRM, matches the actual data encoded in the data packet being processed by the second MRM, then the positional arrangement of the MRMs is determined to match the spectral arrangement of the data packets. However, if the spectral cross-talk data that identifies the data encoded in a data packet being processed by an adjacent, second MRM, does not match the actual data encoded in the data packet being processed by the second MRM, then the positional arrangement of the MRMs is determined to no longer match the spectral arrangement of the data packets. In such cases, the BIST and logic circuitry 120 may determine a spectral ordering of the data packets to address the mismatch. In this way, the BIST and logic circuitry 120 may use the in-band monitoring of spectral cross-talk data to determine whether the positional order of the MRMs corresponds to the spectral order of the data packets.

With continued reference to FIG. 1B, he WOR control circuitry 122 may include hardware, software, firmware, and/or a combination of such components, to regulate and monitor the carrier wavelength of each MRM. As such, each MRM (e.g., MRM_1 104A, MRM_2 104B) may include dedicated WOR control circuitry 122 that compensates for any resonance fluctuation affecting the MRM due to external factors such as temperature variations. In doing so, the WOR control circuitry 122 may insure the stability of the MRM in a real-world deployment. As described herein, each MRM may include a bias-T circuit that is used to generate a photocurrent signal that has both an AC component and a DC component. As described in further detail below with reference to FIG. 2, while the AC component includes the complement of the data, the DC component includes an RMS current value associated with an on-resonance behavior of the MRM. The WOR control circuitry 122 may use the RMS current value to tune the MRM to operate at a specified carrier wavelength.

In some embodiments, the system 102 includes hardware, software, firmware, and/or a combination of such components, configured to support various aspects of spectral ordering of data packets. It should be appreciated that in some embodiments, the BIST and logic circuitry 120 and/or the WOR control circuitry 122 may perform one or more of such example actions in combination with other circuitry of the system 102, such as the memory 114, the processor 112, input/output circuitry 116, and/or the communications circuitry 118. For example, in some embodiments, the BIST and logic circuitry 120 and/or the WOR control circuitry 122 utilizes processing circuitry, such as the processor 112 and/or the like, to form a self-contained subsystem to perform one or more of its corresponding operations. In a further example, and in some embodiments, some or all of the functionality of the BIST and logic circuitry 120 and/or the WOR control circuitry 122 may be performed by the processor 112. Accordingly, in some embodiments, the processor 112 may comprise the BIST and logic circuitry 120 and/or the WOR control circuitry 122. In this regard, some or all of the example processes and algorithms discussed herein can be performed by at least one of the processor 112, the BIST and logic circuitry 120, and/or the WOR control circuitry 122. It should also be appreciated that, in some embodiments, the BIST and logic circuitry 120 and/or the WOR control circuitry 122 may include a separate processor, specially configured field programmable gate array (FPGA), or application specific interface circuit (ASIC) to perform its corresponding functions.

Accordingly, non-transitory computer readable storage media can be configured to store firmware, one or more application programs, and/or other software, which includes instructions and/or other computer-readable program code portions that can be executed to direct operation of the system 102 to implement various operations, including the examples shown herein. As such, a series of computer-readable program code portions may be embodied in one or more computer-program products and can be used, with the system 102, database, and/or other programmable apparatus, to produce the machine-implemented processes discussed herein. It is also noted that all or some of the information discussed herein can be based on data that is received, generated and/or maintained by one or more components of the system 102. In some embodiments, one or more external systems (such as a remote cloud computing and/or data storage system) may also be leveraged to provide at least some of the functionality discussed herein.

Figure 2:
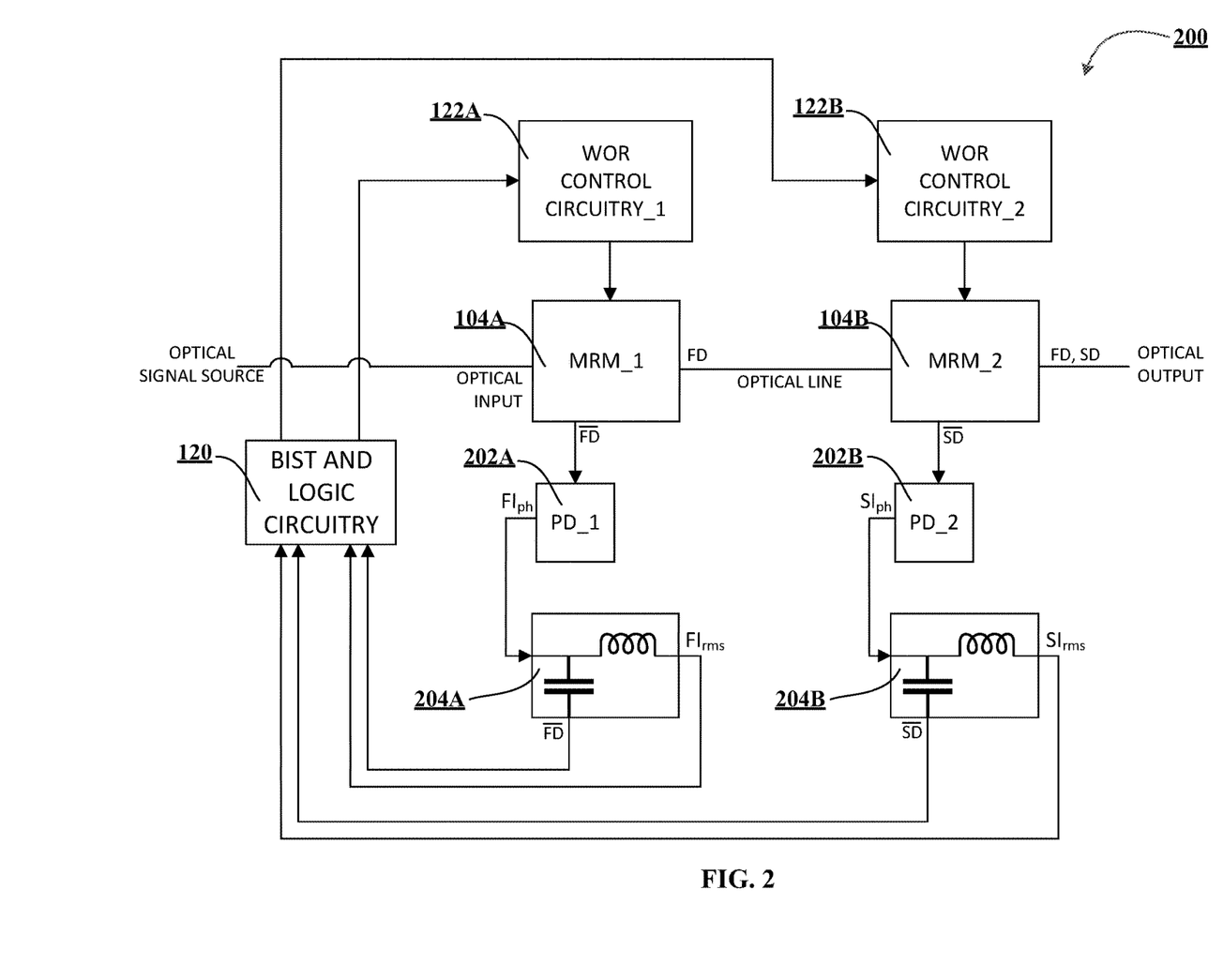
FIG. 2 illustrates an example component level architecture for determining a spectral ordering of data packets based on in-band spectral cross-talk data, in accordance with an embodiment of the present disclosure.

Example Component Architecture for Determining a Spectral Ordering of Data Packets based on In-Band Spectral Cross-talk Data FIG. 2 illustrates an example component level architecture 200 of the technical components for determining a spectral ordering of data packets based on in-band spectral cross-talk data, in accordance with an embodiment of the present disclosure. As shown in FIG. 2, the component level architecture 200 may include a first MRM (MRM_1) 104A, a second MRM (MRM_2) 104B, a first WOR control circuitry (WOR control circuitry_1) 122A operatively coupled to the first MRM (MRM_1), a second WOR control circuitry (WOR control circuitry_2) 122B operatively coupled to the second MRM (MRM_2), a first photodetector (PD_1) 202A operatively coupled to the first MRM (MRM_1), a second photodetector (PD_2) 202B operatively coupled to the second MRM (MRM_2), a first bias-T circuit 204A operatively coupled to the first photodetector (PD_1), and a second bias-T circuit 204B operatively coupled to the second photodetector (PD_2). As shown in FIG. 2, the component level architecture 200 may also include a built-in self-test (BIST) and logic circuitry 120 that is operatively coupled to the first MRM (MRM_1) 104A and the second MRM (MRM_2) 104B and configured to receive input from the first MRM (MRM_1) and the second MRM (MRM_2) via the first bias-T circuit 204A and the second bias-T circuit 204B, respectively. As described in further detail herein, the input received via the first bias-T circuit 204A and the second bias-T circuit 204B may be used by the BIST and logic circuitry 120 to determine the spectral ordering of data packets. In addition, the input received via the first bias-T circuit 204A and the second bias-T circuit 204B may be used by the BIST and logic circuitry 120 to trigger the first and second WOR control circuitry (WOR control circuitry_1 122A and WOR control circuitry_2 122B) to tune the first and second MRMs (MRM_1 104A and MRM_2 104B), respectively, to maintain their operational stability. In specific embodiments, each MRM may include a transimpedance amplifier (not shown) to maintain a constant voltage bias between the corresponding photodetector and the bias-T circuit.

In some embodiments, the first MRM (MRM_1) 104A may be connected to an optical signal source to receive an optical input signal therefrom. The optical input signal may be a continuous wave (CW) light injected into an optical waveguide operatively coupled to the first MRM (MRM_1) 104A. As the MRMs are cascaded in a series connection, the output of the first MRM (MRM_1) 104A is connected to the input of the second MRM (MRM_2) 104B, and so on (additional MRMs and components not shown in FIG. 2 for simplicity and ease of explanation). In a WDM link where multiple optical carrier signals are allowed to be combined for transmission of data packets via a single optical line at different wavelengths without interference, multiple MRMs may be employed to facilitate the communication. Depending on the size of the data and the number of MRMs used, the data is divided into multiple data packets, where each data packet is processed by an MRM. For example, in a transmitter with 8 MRMs, 64-bit data may be divided into 8 data packets (one data packet for each MRM). The first MRM may encode bits 0-7, the second MRM may encode bits 8-15, etc., and the eighth MRM may encode bits 57-64. Accordingly, the first MRM in the example of FIG. 2 (MRM_1) 104A may encode data on to a first data packet (FD) and the second MRM in the example of FIG. 2 (MRM_2) 104B may encode data on to a second data packet (SD), and so on.

As described herein, each MRM may be operatively coupled to a photodetector (PD). In some embodiments, the PD may be operatively coupled to a drop port (not shown) associated with the MRM. The PD may be configured to optically encode a complement of the data being processed by the MRM, resulting in the generation of a photocurrent signal that has both AC components and DC components. For example, if the first MRM in FIG. 2 (MRM_1) 104A is processing a first data packet (FD), the first photodetector (PD_1) 202A may be configured to optically encode a complement of the first data packet (FD), resulting in the generation of a photocurrent $FI_{ph}$ that includes an AC component and a DC component. Similarly, if the second MRM (MRM_2) 104B is processing a second data packet (SD), the second photodetector (PD_2) 202B may be configured to optically encode a complement of the second data packet ($\overline{SD}$), resulting in the generation of a photocurrent $SI_{ph}$ that includes an AC component and a DC component. The AC component of the photocurrent may include the complement of the data packet while the DC component of the photocurrent may include an RMS current value associated with on-resonance behavior of the MRM. For example, the AC component of the $FI_{ph}$ may include $\overline{FD}$, while the DC component of $FI_{ph}$ may include an RMS current value ($FI_{rms}$) associated with on-resonance behavior of the first MRM (MRM_1) 104A. Similarly, the AC component of the $SI_{ph}$ may include $\overline{SD}$, while the DC component of $SI_{ph}$ may include an RMS current value ($SI_{rms}$) associated with on-resonance behavior of the second MRM (MRM_2) 104B.

In some example embodiments, each photodetector may be operatively coupled to a bias-T circuit. The bias-T circuit may be a three-port circuit that is used for setting a DC bias point and inserting DC power into an AC signal to separate the AC component and the DC component. For example, the first bias-T circuit 204A may be configured to receive $FI_{ph}$ from the first photodetector (PD_1) 202A and separate the AC component and the DC component from $FI_{ph}$. The AC component of $FI_{ph}$ may include $\overline{FD}$ while the DC component may include $FI_{rms}$. Similarly, the second bias-T circuit 204B may be configured to receive $SI_{ph}$ from the second photodetector (PD_2) 202B and separate the AC component and the DC component from $SI_{ph}$. The AC component of $SI_{ph}$ may include $\overline{SD}$ while the DC component may include $SI_{rms}$.

As described herein, the BIST and logic circuitry 120 may determine whether the positional order of the MRMs (e.g., the first and second MRMs 104A, 104B) corresponds to the spectral order of the data packets. In this regard, the BIST and logic circuitry 120 may receive the AC component and the DC component from each MRM. For example, the BIST and logic circuitry 120 may receive $\overline{FD}$ and $FI_{rms}$ from the first MRM (MRM_1) 104A and $\overline{SD}$ and $SI_{rms}$ from the second MRM (MRM_2) 104B. The complement of the data packet may not only include information associated with the data encoded in the data packet processed by the MRM but may also include cross-talk data from an adjacent MRM. For example, the $\overline{FD}$ may not only identify the data encoded in the first data packet (FD) processed by the first MRM (MRM_1) 104A but may also include spectral cross-talk data that may identify the data encoded in the second data packet (SD) that is being processed by the second MRM (MRM_2). Similarly, SD may not only identify the data encoded in the second data packet (SD) processed by the second MRM (MRM_2) 104B but may also include spectral cross-talk data that may identify the data encoded in a third data packet that is being processed by a third MRM (MRM_3) (not shown), if the third MRM (MRM_3) were cascaded in a series connection with the first and second MRMs (MRM_1 104A and MRM_2 104B). In some embodiments, the spectral cross-talk may be a function of a number of factors such as filter spectral width, extinction ratio, spectral channel spacing with respect to the encoded modulation data rate, and/or the like. For example, for 100 Gbps non-return to zero (NRZ) encoded data, the carrier frequency may have 1st and 2nd order harmonics at 100 GHz intervals both above and below the main carrier frequency. To minimize cross-talk, the neighboring carrier frequency would be higher or lower than the main carrier frequency by more than 100 GHz or 200 GHz, resulting in one carrier frequency at 200 THz and another carrier frequency at 200.25 THz to allow for two harmonics at 100 GHz spacing and a 50 GHz guard-band. If this spacing is reduced by temperature variations, one channel will see increased cross-talk from a neighboring channel. This deleterious effect can be used to "listen in" on the neighboring channel to determine the spectral order of the received packets.

Having received $\overline{FD}$ and $\overline{SD}$, the BIST and logic circuitry 120 may determine whether the second MRM (MRM_2) spectral cross-talk data received as part of $\overline{FD}$ matches $\overline{SD}$, the actual data encoded in a data packet that is being processed by the second MRM (MRM_2). If the second MRM (MRM_2) spectral cross-talk data matches $\overline{SD}$, then the BIST and logic circuitry 120 may determine that spectral ordering of the data packets does not require alteration. However, if the second MRM (MRM_2) spectral cross-talk data does not match $\overline{SD}$, then the BIST and logic circuitry 120 may determine that spectral ordering of the data packets requires alteration. The BIST and logic circuitry 120 may alter the spectral ordering to address the mismatch. In this way, the BIST and logic circuitry 120 may use the in-band monitoring of spectral cross-talk data to determine whether the positional order of the MRMs corresponds to the spectral order of the data packets.

In some embodiments, in addition to determining the spectral ordering of the data packets, the BIST and logic circuitry 120 may trigger the WOR control circuitry 122A, 122B to regulate and monitor the carrier wavelength of each MRM. To this end, the BIST and logic circuitry 120 may monitor the RMS current value associated with an on-resonance behavior of each MRM to track and lock that MRM to its carrier wavelength. For example, $FI_{rms}$ may be used to track and lock the first MRM (MRM_1) 104A to the carrier wavelength corresponding to the first MRM (MRM_1) 104A and $SI_{rms}$ may be used to track and lock the second MRM (MRM_2) 104B to the carrier wavelength corresponding to the second MRM (MRM_2) 104B. In some embodiments, the BIST and logic circuitry 120 may implement a sample-and-hold feedback logic circuit to monitor the RMS current value and provide feedback to the WOR control circuitry 122A, 122B to tune each MRM. For example, the BIST and logic circuitry 120 may monitor $FI_{rms}$ and provide feedback to the first WOR control circuitry 122A indicating a deviation in the on-resonance behavior of the first MRM (MRM_1) 104A, and subsequently trigger the first WOR control circuitry 122A to track and lock the first MRM (MRM_1) 104A to its carrier wavelength. Similarly, the BIST and logic circuitry 120 may monitor $SI_{rms}$ and provide feedback to the second WOR control circuitry 122B indicating a deviation in the on-resonance behavior of the second MRM (MRM_2) 104B, and subsequently trigger the second WOR control circuitry 122B to track and lock the second MRM (MRM_2) 104B to its carrier wavelength.

Example Methods for Determining a Spectral Ordering of Data Packets

Figure 3:
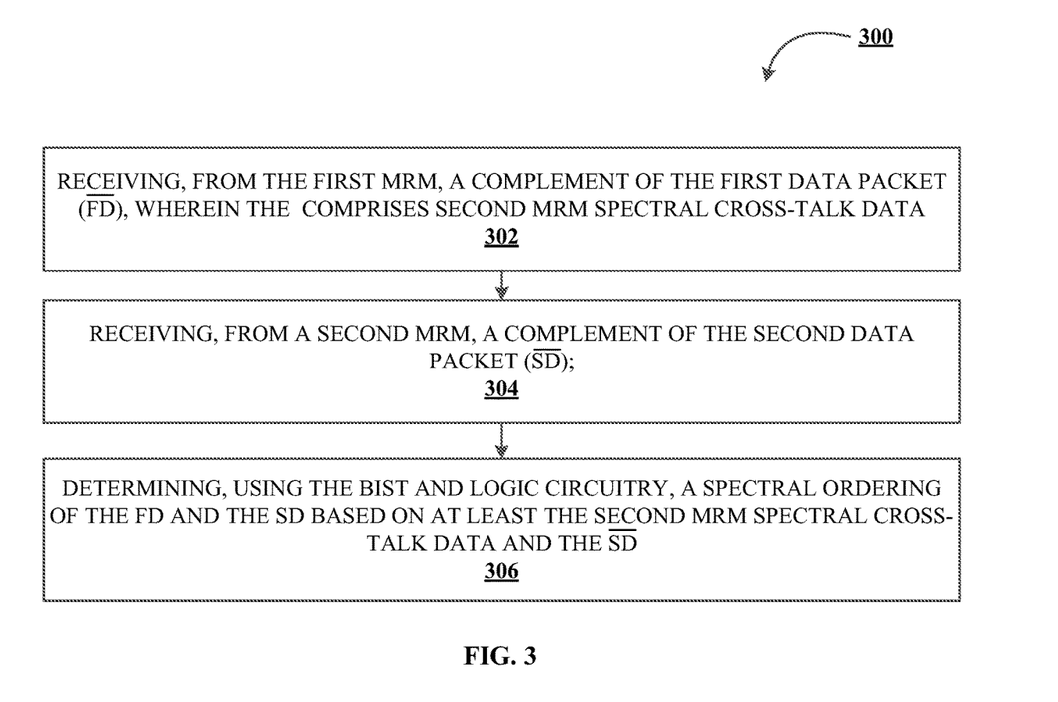
FIG. 3 illustrates an example method for determining a spectral ordering of data packets based on in-band spectral cross-talk data, in accordance with an embodiment of the present disclosure.

FIG. 3 illustrates an example method 300 for determining a spectral ordering of data packets based on in-band spectral cross-talk data, in accordance with an embodiment of the present disclosure. As shown in block 302, the method includes receiving, from a first micro ring modulator (MRM), a complement of a first data packet ($\overline{FD}$), wherein the $\overline{FD}$ comprises second MRM spectral cross-talk data. As described herein, each MRM may be operatively coupled to a PD configured to optically encode a complement of the data being processed by the MRM, resulting in the generation of a photocurrent signal that has both AC components and DC components. As such, the first MRM may include a first PD operatively coupled to a first drop port of the first MRM and configured to generate a first photocurrent ($FI_{ph}$). The first photocurrent $FI_{ph}$ may include an AC component and a DC component. The AC component of $FI_{ph}$ may include the $\overline{FD}$. $\overline{FD}$ may not only identify the data encoded in the first data packet (FD) processed by first MRM but may also include spectral cross-talk data that may identify the data encoded in the second data packet (SD) being processed by the second MRM (e.g., second MRM spectral cross-talk data).

Next, as shown in block 304, the method includes receiving, from a second MRM, a complement of a second data packet ($\overline{SD}$). Similarly, the second MRM may include a second PD operatively coupled to a second drop port of the second MRM and configured to generate a second photocurrent ($SI_{ph}$). The second photocurrent $SI_{ph}$ may include an AC component and a DC component. The AC component of $SI_{ph}$ may include the $\overline{SD}$. $\overline{SD}$ may not only identify the data encoded in the SD processed by second MRM, but also include spectral cross-talk data that may identify the data encoded in a third data packet that is being processed by a third MRM, if there is a third MRM cascaded in a series connection with the first MRM and the second MRM.

Next, as shown in block 306, the method includes determining, using a built-in self-test (BIST) and logic circuitry, a spectral ordering of the FD and the SD based on at least the second MRM spectral cross-talk data and the $\overline{SD}$. In some embodiments, the method may include comparing the second MRM spectral cross-talk data and the $\overline{SD}$ to determine a spectral order of the FD and SD based on whether the second MRM spectral cross-talk data matches the $\overline{SD}$.

Figure 4:
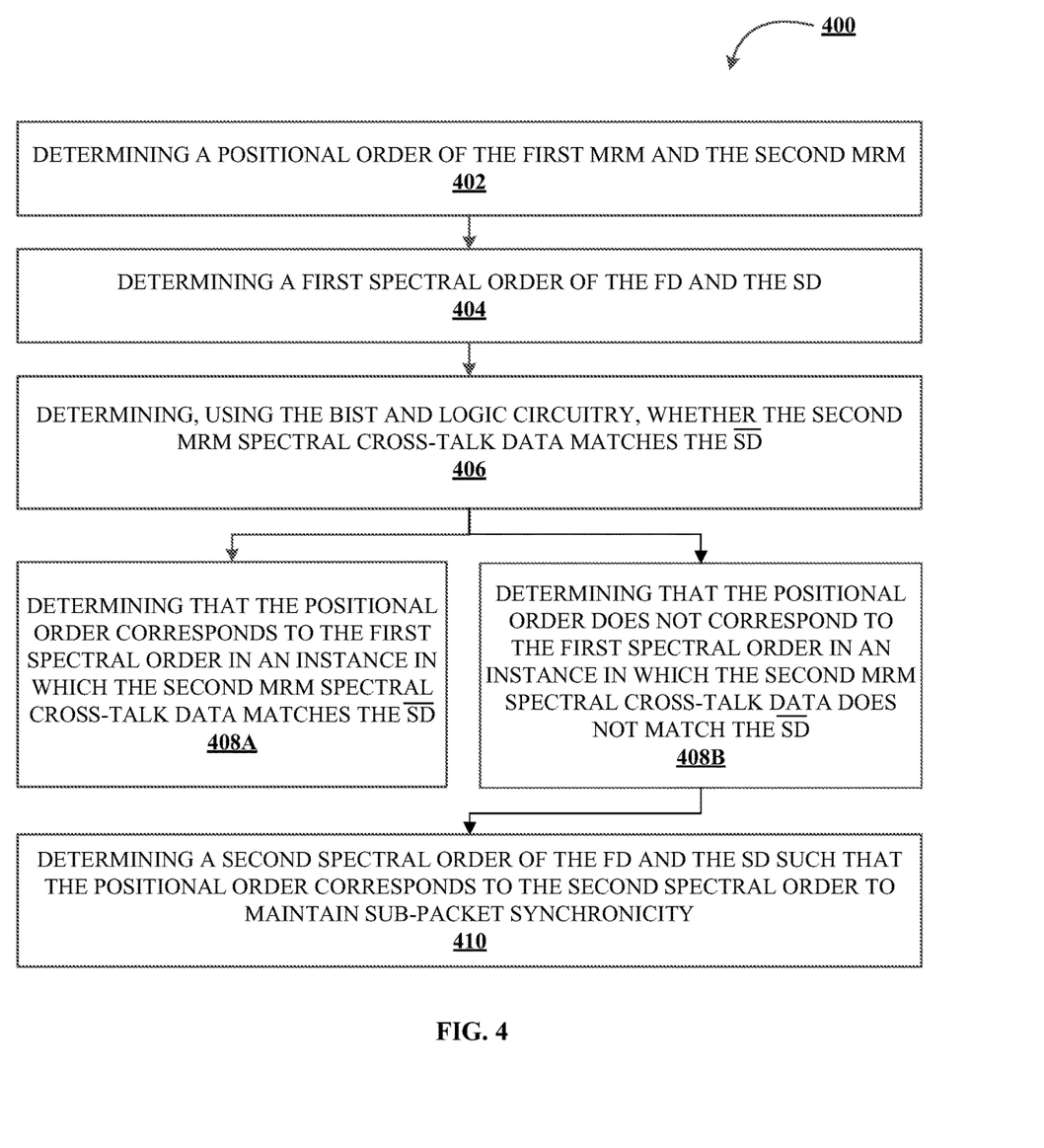
FIG. 4 illustrates an example method for determining whether a positional order of the micro ring modulators (MRMs) corresponds to a spectral order of the data packets, in accordance with an embodiment of the present disclosure.

FIG. 4 illustrates an example method 400 for determining whether a positional order of the micro ring modulators (MRMs) corresponds to a spectral order of the data packets, in accordance with an embodiment of the present disclosure. As shown in block 402, the method includes determining a positional order of the first MRM and the second MRM. As described herein, when a WDM link is transmitting data, multiple MRMs may be employed to facilitate the communication. Depending on the size of the data and the number of MRMs used, the data is divided into multiple data packets, where each data packet is processed by an MRM. Once transmitted, a receiver may receive each data packet individually and combine them to recreate the original data. To efficiently combine the data packets, the first MRM and the second MRM are positionally ordered (on-chip) in a particular way to facilitate data communication.

Next, as shown in block 404, the method includes determining a first spectral order of the FD and the SD. During initial transmitter and receiver setup, the positional order of the first MRM and the second MRM is mapped to the spectral order of the data packets in such a way that the receiver is aware of the order of the data packets it receives, allowing for efficient recreation of the data. However, local temperature variations in the transmitter may result in a shift in the initial mapping of the positional order as compared to the spectral order. In some embodiments, any shift in the initial mapping of the positional order with respect to the spectral order may be identified by monitoring the spectral cross-talk data that identifies the data encoded in SD that is being processed by the second MRM and the actual data encoded in the SD that is being processed by the second MRM.

Next, as shown in block 406, the method includes determining, using the BIST and logic circuitry, whether the spectral cross-talk data from the second MRM matches the $\overline{SD}$. If the spectral cross-talk data from the second MRM matches the $\overline{SD}$, then the the positional order corresponds to the first spectral order, as shown in block 408A. However, if the second MRM spectral cross-talk data does not match $\overline{SD}$, then the method includes determining that the positional order does not correspond to the first spectral order, as shown in block 408B. In response, as shown in block 410, the method may include determining a second spectral order of the FD and the SD such that the positional order corresponds to the second spectral order to maintain sub-packet synchronicity. Having determined the second order, the method may include re-ordering, using the BIST and logic circuitry, the FD and the SD according to the second spectral order.

It is to be understood that while embodiments of the present disclosure focus on the spectral re-ordering of data packets on the transmitter side, a similar technique of re-ordering data packets may be employed by the receiver based on local thermal fluctuations on the receiver side.

As described herein, embodiments of the present invention may also be implemented as a computer program product for in-band spectral cross-talk monitoring. Accordingly, the computer program product may include a non-transitory computer-readable medium comprising code causing an apparatus to: receive, from a first micro ring modulator (MRM), a complement of a first data packet ($\overline{FD}$), wherein the $\overline{FD}$ comprises second MRM spectral cross-talk data; receive, from a second MRM, a complement of a second data packet ($\overline{SD}$); and determine, using a built-in self-test (BIST) and logic circuitry, a spectral ordering of the FD and the SD based on at least the second MRM spectral cross-talk data and the $\overline{SD}$.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for in-band spectral cross-talk monitoring, the system comprising:
a built-in self-test (BIST) and logic circuitry; and
a processor operatively coupled to the BIST and logic circuitry, a first micro ring modulator (MRM) associated with a first data packet (FD), and a second MRM associated with a second data packet (SD), wherein the processor is configured to:
receive, from the first MRM, a complement of the first data packet ($\overline{FD}$), wherein the $\overline{FD}$ comprises second MRM spectral cross-talk data;
receive, from a second MRM, a complement of the second data packet ($\overline{SD}$);
determine, using the BIST and logic circuitry, a spectral ordering of the FD and the SD based on at least the second MRM spectral cross-talk data and the $\overline{SD}$; and
re-order, using the BIST and logic circuitry, the FD and the SD based on the determined spectral ordering.

2. The system of claim 1, wherein:
the first MRM is configured to encode the FD on a first carrier wavelength,
the second MRM is configured to encode the SD on a second carrier wavelength,
wherein the first carrier wavelength is shorter than the second carrier wavelength.

3. The system of claim 1, wherein the processor is further configured to:
determine a positional order of the first MRM and the second MRM;
determine a first spectral order of the FD and the SD;
determine, using the BIST and logic circuitry, whether the second MRM spectral cross-talk data matches the $\overline{SD}$; and
determine that the positional order corresponds to the first spectral order in an instance in which the second MRM spectral cross-talk data matches the $\overline{SD}$.

4. The system of claim 3, wherein the processor is further configured to:
determine that the positional order does not correspond to the first spectral order in an instance in which the second MRM spectral cross-talk data does not match the $\overline{SD}$.

5. The system of claim 4, wherein, in an instance in which the positional order does not correspond to the first spectral order, the processor is further configured to:
determine a second spectral order of the FD and the SD such that the positional order corresponds to the second spectral order; and
re-order, using the BIST and logic circuitry, the FD and the SD according to the second spectral order.

6. The system of claim 1, wherein:
   the first MRM comprises a first photodetector (PD) operatively coupled to a first drop port of the first MRM and configured to generate a first photocurrent ($FI_{ph}$), and
   the second MRM comprises a second PD operatively coupled to a second drop port of the second MRM and configured to generate a second photocurrent ($SI_{ph}$).

7. The system of claim 6, wherein each of the $FI_{ph}$, and $SI_{ph}$ comprises an alternating current (AC) component and a direct current (DC) component.

8. The system of claim 7, wherein the AC component of $FI_{ph}$ comprises the $\overline{FD}$, and the AC component of $SI_{ph}$ comprises the $\overline{SD}$.

9. The system of claim 7, wherein the DC component of $FI_{ph}$ comprises a root means square (RMS) current value associated with on-resonance behavior of the first MRM, and the DC component of $SI_{ph}$ comprises an RMS current value associated with on-resonance behavior of the second MRM.

10. The system of claim 9, wherein the processor is further configured to:
   tune, using a first wavelength of resonance (WOR) control circuitry, the first MRM to a first carrier frequency based on at least the RMS current value associated with the on-resonance behavior of the first MRM; and
   tune, using a second WOR control circuitry, the second MRM to a second carrier frequency based on at least the RMS current value associated with the on-resonance behavior of the second MRM.

11. A method for in-band spectral cross-talk monitoring, the method comprising:
   receiving, from a first micro ring modulator (MRM), a complement of a first data packet ($\overline{FD}$), wherein the $\overline{FD}$ comprises second MRM spectral cross-talk data;
   receiving, from a second MRM, a complement of a second data packet ($\overline{SD}$); and
   determining, using a built-in self-test (BIST) and logic circuitry, a spectral ordering of the FD and the SD based on at least the second MRM spectral cross-talk data and the $\overline{SD}$; and
   re-ordering, using the BIST and logic circuitry, the FD and the SD based on the determined spectral ordering.

12. The method of claim 11, wherein:
   the first MRM is configured to encode the FD on a first carrier wavelength,
   the second MRM is configured to encode the SD on a second carrier wavelength,
   wherein the first carrier wavelength is shorter than the second carrier wavelength.

13. The method of claim 11, wherein the method further comprises:
   determining a positional order of the first MRM and the second MRM;
   determining a first spectral order of the FD and the SD;
   determining, using the BIST and logic circuitry, whether the second MRM spectral cross-talk data matches the $\overline{SD}$; and
   determining that the positional order corresponds to the first spectral order in an instance in which the second MRM spectral cross-talk data matches the $\overline{SD}$.

14. The method of claim 13, wherein the method further comprises determining that the positional order does not correspond to the first spectral order in an instance in which the second MRM spectral cross-talk data does not match the $\overline{SD}$.

15. The method of claim 14, wherein, in an instance in which the positional order does not correspond to the first spectral order, the method further comprises:
   determining a second spectral order of the FD and the SD such that the positional order corresponds to the second spectral order; and
   re-ordering, using the BIST and logic circuitry, the FD and the SD according to the second spectral order.

16. The method of claim 11, wherein:
   the first MRM comprises a first photodetector (PD) operatively coupled to a first drop port of the first MRM and configured to generate a first photocurrent ($FI_{ph}$),
   the second MRM comprises a second PD operatively coupled to a second drop port of the second MRM and configured to generate a second photocurrent ($SI_{ph}$),
   wherein each of the $FI_{ph}$, and $SI_{ph}$ comprises an alternating current (AC) component and a direct current (DC) component, wherein the AC component of $FI_{ph}$ comprises the $\overline{FD}$, and the AC component of $SI_{ph}$ comprises the $\overline{SD}$, wherein the DC component of $FI_{ph}$ comprises a root means square (RMS) current value associated with on-resonance behavior of the first MRM, and the DC component of $SI_{ph}$ comprises an RMS current value associated with on-resonance behavior of the second MRM.

17. A computer program product for in-band spectral cross-talk monitoring, the computer program product comprising a non-transitory computer-readable medium comprising code causing an apparatus to:
   receive, from a first micro ring modulator (MRM), a complement of a first data packet ($\overline{FD}$), wherein the $\overline{FD}$ comprises second MRM spectral cross-talk data;
   receive, from a second MRM, a complement of a second data packet ($\overline{SD}$); and
   determine, using a built-in self-test (BIST) and logic circuitry, a spectral ordering of the FD and the SD based on at least the second MRM spectral cross-talk data and the $\overline{SD}$; and
   re-order, using the BIST and logic circuitry, the FD and the SD based on the determined spectral ordering.

18. The computer program product of claim 17, wherein:
   the first MRM is configured to encode the FD on a first carrier wavelength,
   the second MRM is configured to encode the SD on a second carrier wavelength,
   wherein the first carrier wavelength is shorter than the second carrier wavelength.

19. The computer program product of claim 17, wherein the apparatus is configured to:
   determine a positional order of the first MRM and the second MRM;
   determine a first spectral order of the FD and the SD;
   determine, using the BIST and logic circuitry, whether the second MRM spectral cross-talk data matches the $\overline{SD}$; and
   determine that the positional order corresponds to the first spectral order in an instance in which the second MRM spectral cross-talk data matches the $\overline{SD}$.

20. The computer program product of claim 19, wherein the apparatus is configured to:
   determine that the positional order does not correspond to the first spectral order in an instance in which the second MRM spectral cross-talk data does not match the $\overline{SD}$.

* * * * *

UNITED STATES PATENT AND TRADEMARK OFFICE
CERTIFICATE OF CORRECTION

PATENT NO. : 12,334,975 B2  
APPLICATION NO. : 18/110206  
DATED : June 17, 2025  
INVENTOR(S) : Mir Ashkan Seyedi Page 1 of 1

It is certified that error appears in the above-identified patent and that said Letters Patent is hereby corrected as shown below:

In the Claims

In Column 17, Lines 11-13:  
Claim 8 should read:  
8. The system of Claim 7, wherein the AC component of $FI_{ph}$ comprises the $\overline{FD}$, and the AC component of $SI_{ph}$ comprises the $\overline{SD}$.

Signed and Sealed this  
Twenty-ninth Day of July, 2025

Coke Morgan Stewart  
*Acting Director of the United States Patent and Trademark Office*